UNITED STATES PATENT OFFICE.

HIPPOLYTE MÈGE, OF PARIS, FRANCE.

IMPROVEMENT IN PROCESSES FOR PRESERVING MEATS.

Specification forming part of Letters Patent No. 175,483, dated March 28, 1876; application filed January 31, 1876.

*To all whom it may concern:*

Be it known that I, HIPPOLYTE MÈGE, of Paris, France, chemist, have invented a Process of Preserving Meat, of which the following is a specification:

Heretofore the flesh of animals has not been successfully prepared for preservation except at the expense of its nutritive qualities, thus: The flesh of an animal just killed possesses its highest alimentary power, because it contains intact the nitrogenous, phosphoric, and other principles destined to repair our strength. On the other hand, flesh, when cooked, loses the greater portion of its alimentary power, because these reparatory principles are decomposed by fermentation and heat.

Flesh preserved by desiccation, salting, smoking, or other antiseptic processes undergoes the same decompositions, and, besides, it produces, under the action of the air, compounds prejudicial to health. It is, therefore, according to the best scientific authorities, necessary for meat which is to be consumed or preserved to unite two conditions. These two conditions, difficult of combination, consist in obtaining the meat with all the qualities which cooking produces, and in applying such a cooking as in no respect affects the composition of the meat in its raw state. In a word, it is necessary to produce cooked meat with all the alimentary power of raw meat.

In order to understand this operation, it is to be remembered that Magendie has proved that vegetable flesh becomes as nutritive as the flesh of animals when it is seasoned with the aromatic juice of cooked meat. It is necessary to refer to the experiments of Spallanzain, Claude Bernard, and the most celebrated physiologists as to the influence of digestive action upon pin or deteriorated nutritious substances; to think of the observation of Mr. Chevreul, who states that the digestive actions restore cooked meat to the condition of raw meat, and to add experiments which prove that this physiological action preserves meat from the decomposing action of the heat during cooking and gives it remarkable preservative qualities. On these theoretical data is founded the process, the practical application of which will now be described.

First, an ox or any other animal is treated immediately on its being felled, the bones and offal are removed, and the rennet, pancreas, and other parts which are connected with digestion are put aside. The muscular tissue is cut up, and the other tissues, fat or lean, are crushed and immediately exposed to a temperature of about 200° Fahrenheit, which is enough to prevent any beginning of fermentation. The fat is then poured off, the meat is removed from the action of the heat, and is mechanically rubbed so as to open all its pores. Further, the rennet, pancreas, liver, and other digestive parts are bruised raw together, so as to form a sort of cream along with the juice that has flowed from the heated meat. This vital juice, seasoned if desired, or colored, by the aid of known salts or spices, is then mingled with the whole of the meat. After a brief soaking this digestive juice is absorbed, and the mass is then powdered with vegetable-flesh, that is to say, crude gluten or meat rich in nitrogenous principles. When the mass, well worked, has assumed a regular color and good consistence, it is put in a very strong cylindrical vessel provided at bottom with an opening of the size and shape of a fillet of beef or other desired piece of meat. When the vessel is filled, the surface of the mass is pressed upon by a piston fitting the vessel so as to be squeezed through the bottom orifice. When a sufficient length is squeezed out, it is cut off, and so on till the vessel is emptied. These pieces of meat, on issuing from the press, are placed in metal cases containing a portion of the fat that had been poured off. The cases are soldered and heated in water in the usual manner. During this heating, which may be at temperatures from 170° to 212° Fahrenheit, according to the time during which the meat is to be preserved, the physiological agents rapidly restore the meat to the condition of raw meat, and afterward they preserve its principles from decomposition, so that when removed from the case the meat resembles roast beef, tender, savory, and suited for any seasoning or sauces usually employed.

The preserving in soldered cases has many disadvantages. The following method is to be preferred: After heating in the case, it is allowed to cool, so that all the vacuous interstices become filled. The meat is then taken out of the case and wrapped in tin-foil or other water-proof covering. For greater safety during transport the pieces so wrapped up are charged into a case or cask lined with metal or fabric impermeable to air and water, and are separated by bran, sawdust, or like materials, to which is added any known substance greedy of oxygen, such as sulphite. The case or cask, when filled, is soldered or closed hermetically.

Second, it has long been attempted to produce a substance (which would be of great value if properly made) called meat-bread. A good result is obtained by applying these new processes. For this purpose, all the suitable operations above described in paragraph first are carried out, only the bruising is carried further, and ordinary flour is employed to bring the mass to the condition of a stiff paste. In this way the meat-bread produced, instead of being dried, remains in fresh condition, and the vegetable-flesh, animalized, becomes highly nutritive.

Third, if it is not possible or desirable to employ the means above described, then the meat-bread can be made in the usual way, and the animal paste, without changing anything; but the paste so made may be divided, cooked, and preserved by the means described above. A product is thus obtained which may be of great use, and which, softened and diluted in water, soups, or vegetable liquors, gives a result superior to extracts of meat.

Having thus described the nature of my said invention and the manner in which the same shall be carried into practice, I claim, chiefly—

The process herein described for preserving meat, consisting in subjecting the meat to a temperature of 170° to 200° Fahrenheit, and then impregnating it with digestive tissues and juices, substantially in the manner described.

In testimony whereof I have signed my name to this specification before two subscribing witnesses.

H. MÈGE.

Witnesses:
ARMENGAUD Jeune,
ROBT. M. HOOPER.